(12) United States Patent
Duppenthaler et al.

(10) Patent No.: US 10,310,850 B2
(45) Date of Patent: Jun. 4, 2019

(54) METHODS AND SYSTEMS FOR DETERMINING RELEVANT CHANGES IN AN API

(71) Applicant: FACEBOOK, INC., Menlo Park, CA (US)

(72) Inventors: Mark Ginga Misawa Duppenthaler, San Francisco, CA (US); Pin Xu, Redwood City, CA (US); David Scoville, East Palo Alto, CA (US); Carpus Gain Chang, San Francisco, CA (US); Reagan Boyd Williams, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 52 days.

(21) Appl. No.: 15/298,121

(22) Filed: Oct. 19, 2016

(65) Prior Publication Data

US 2018/0107479 A1    Apr. 19, 2018

(51) Int. Cl.
*G06F 8/65* (2018.01)
*G06F 8/71* (2018.01)
*G06F 8/75* (2018.01)
*G06F 9/445* (2018.01)

(52) U.S. Cl.
CPC ............... *G06F 8/71* (2013.01); *G06F 8/65* (2013.01); *G06F 8/75* (2013.01); *G06F 9/445* (2013.01)

(58) Field of Classification Search
CPC ......... G06F 8/65; G06F 8/71; G06F 8/75–751
See application file for complete search history.

(56) References Cited

U.S. PATENT DOCUMENTS

| 7,191,436 | B1* | 3/2007 | Durr | G06F 8/65 707/999.005 |
| 7,814,544 | B1* | 10/2010 | Wilhelm | G06F 21/566 719/328 |
| 8,010,950 | B1* | 8/2011 | Silaev | G06F 11/3672 717/131 |
| 8,499,349 | B1* | 7/2013 | Cruz | G06F 21/568 726/24 |
| 8,539,475 | B2* | 9/2013 | Ershov | G06F 11/3604 717/170 |

(Continued)

OTHER PUBLICATIONS

Linares-Vasquez et al., API Change and Fault Proneness: A Threat to the Success of Android Apps, published by ACM, ESEC/FSE '13, Aug. 18-26, 2013, pp. 477-478 (Year: 2013).*

(Continued)

*Primary Examiner* — Thuy Dao
*Assistant Examiner* — Zheng Wei
(74) *Attorney, Agent, or Firm* — Morgan, Lewis & Bockius LLP

(57) ABSTRACT

Methods, systems, and/or devices for determining relevant changes to an API are described herein. In one aspect, a server system receives a request from a client to compare two versions of an API. A comparison of the two versions, and any intervening versions, of the API is performed by a server, which may then rank the comparison results based on the call volume or other criteria and will return the ranked results to a client for display to a user. Options include restricting the list of changes to just changes impacting a specific client application.

11 Claims, 10 Drawing Sheets

(56) References Cited

U.S. PATENT DOCUMENTS

| | | | | |
|---|---|---|---|---|
| 8,863,108 B2* | 10/2014 | Das | | G06F 8/71 |
| | | | | 717/168 |
| 9,563,490 B1* | 2/2017 | Batinich | | G06F 9/543 |
| 9,792,114 B1* | 10/2017 | Schaefer | | G06F 8/71 |
| 9,804,838 B2* | 10/2017 | Grechanik | | G06F 8/70 |
| 2002/0002567 A1* | 1/2002 | Kanie | | G06F 17/218 |
| | | | | 715/234 |
| 2003/0084335 A1* | 5/2003 | Moran | | G06Q 10/20 |
| | | | | 726/8 |
| 2003/0110313 A1* | 6/2003 | Dochez | | G06F 11/3676 |
| | | | | 719/328 |
| 2003/0159130 A1* | 8/2003 | Broussard | | G06F 8/71 |
| | | | | 717/120 |
| 2004/0075857 A1* | 4/2004 | Akiyoshi | | G06F 8/61 |
| | | | | 358/1.13 |
| 2007/0192872 A1* | 8/2007 | Rhoads | | G06F 3/017 |
| | | | | 726/26 |
| 2007/0288897 A1* | 12/2007 | Branda | | G06F 8/70 |
| | | | | 717/124 |
| 2008/0134156 A1* | 6/2008 | Osminer | | G06F 9/44589 |
| | | | | 717/140 |
| 2010/0235823 A1* | 9/2010 | Garbers | | G06F 8/71 |
| | | | | 717/170 |
| 2011/0078674 A1* | 3/2011 | Ershov | | G06F 8/75 |
| | | | | 717/170 |
| 2011/0099068 A1* | 4/2011 | Takano | | G06Q 30/02 |
| | | | | 705/14.54 |
| 2011/0231832 A1* | 9/2011 | Dorn | | G06F 8/65 |
| | | | | 717/170 |
| 2011/0231865 A1* | 9/2011 | Dorn | | G06F 9/44 |
| | | | | 719/328 |
| 2012/0011507 A1* | 1/2012 | Sasaki | | G06F 8/65 |
| | | | | 718/1 |
| 2012/0131564 A1* | 5/2012 | Das | | G06F 8/71 |
| | | | | 717/168 |
| 2012/0222024 A1* | 8/2012 | Das | | G06F 9/44521 |
| | | | | 717/170 |
| 2013/0086553 A1* | 4/2013 | Grechanik | | G06F 8/70 |
| | | | | 717/123 |
| 2014/0355049 A1* | 12/2014 | Hadano | | G06F 3/123 |
| | | | | 358/1.15 |
| 2015/0012488 A1* | 1/2015 | van Rossum | | G06F 17/30581 |
| | | | | 707/611 |
| 2015/0121135 A1* | 4/2015 | Pape | | G06F 11/1484 |
| | | | | 714/15 |
| 2015/0128156 A1* | 5/2015 | Zhu | | G06F 8/74 |
| | | | | 719/328 |
| 2015/0339113 A1* | 11/2015 | Dorman | | G06F 16/178 |
| | | | | 717/169 |
| 2015/0347552 A1* | 12/2015 | Habouzit | | G06F 17/30174 |
| | | | | 707/613 |
| 2015/0363186 A1* | 12/2015 | Judge | | G06F 8/65 |
| | | | | 717/170 |
| 2016/0335168 A1* | 11/2016 | Freiberg | | G06F 11/3604 |
| 2017/0060575 A1* | 3/2017 | Agrawal | | G06F 8/65 |
| 2017/0161033 A1* | 6/2017 | Darcy | | G06F 8/41 |
| 2017/0277481 A1* | 9/2017 | Sako | | G06F 3/1206 |
| 2017/0337052 A1* | 11/2017 | Elkabany | | G06F 8/71 |
| 2017/0371937 A1* | 12/2017 | Shah | | G06F 17/30554 |

OTHER PUBLICATIONS

Kim et al., Automatic Inference of Structural Changes for Matching Across Program Versions, published by IEEE, 29th International Conference on Software Engineering (ICSF'07), pp. 1-10 (Year: 2007).*

* cited by examiner

Select App

Graph API Explorer ▼ — 402

Upgrade from: v2.0 ▼ — 404    Upgrade to: v2.6 ▼ — 406

⎫
⎬ 490
⎭

Items to fix to upgrade Graph API Explorer from v2.0 to v2.6:

440 — 39 Items

| Version 450 | Call 452 Volume | Affected Methods 454 | Description 456 | Type 458 |
|---|---|---|---|---|
| 12 April 2018 v2.6 — 462 | 99.8% 5.6M | GET {user-id}/feed 3.9M<br>GET {user-id}/home 904.8K<br>GET {event-id}/feed 407.2K<br>GET {page-id}/posts 365.1K | '{post-id}?fields+to' will return Profile nodes, rather than User or Page nodes | ⓘ Change |
| 10 July 2017 v2.4 — 464 | 99.1% 5.5M | GET {user-id}/feed 3.9M<br>GET {user-id}/home 904.8K<br>GET {event-id}/feed 407.2K<br>GET {page-id}/posts 342.7K | Nodes in the graph API will return fewer fields by default. Use the 'fields' param to explicitly ask for the set of fields you want. If you ask for an explicit set of fields, the response will not contain any extra fields that you did not ask for | ⓘ Change |
| 9 October 2017 v2.5 — 466 | 99.1% 5.5M | GET {user-id}/feed 3.9M<br>GET {user-id}/home 904.8K<br>GET {event-id}/feed 407.2K<br>GET {page-id}/posts 343.1K | The Post node now contains a 'target' indicating the profile it was posted on | ⊕ New |
| 9 October 2017 v2.5 — 468 | 99.1% 5.5M | GET {user-id}/feed 3.9M<br>GET {user-id}/home 904.8K<br>GET {event-id}/feed 407.2K<br>GET {page-id}/posts 343.1K | The 'message_tags', 'name_tags', and 'description_tags' fields, exposed on various objects, will now always be returned as a list, where they were previously returned as a list in some cases and map in others | ⓘ Change |
| 9 October — 469 | 99.0% | GET {user-id}/feed 3.9M | Removes the address filed on the User mode | ⊗ Depreciation |

METHODS AND SYSTEMS FOR DETERMINING RELEVANT CHANGES IN AN API

TECHNICAL FIELD

The disclosed implementations relate generally to application software development, and, in particular, to determining changes to Application Program Interfaces ("API") in newer API versions.

BACKGROUND

Application Program Interfaces provide a way for a platform (e.g., Facebook) to provide controls that developers of client applications can use to access a platform's features and data. APIs thus ensure that client applications will have access to the functions and data that the platform wishes for the client applications to have. However, APIs may change over time, resulting in a newer version of an API that differs from the earlier version of the API. The newer versions of the API may provide enhanced additional or otherwise different features or other benefits over the older API versions. Additionally, platforms may decide to cease supporting older API versions. Accordingly, developers of client applications that use the API may wish update their applications to use the newer version of the API.

Historically, developers of platforms with one or more APIs will publish a list of changes associated with each version of the platform's API(s). For example, when an API is upgraded from version 2.0 to version 2.1, a list of changes to calls (and potentially new or removed calls) will be published. When the API is upgraded again from version 2.1 to version 2.2, another list of changes will be published. Developers of client applications will read these lists of changes and determine what changes, if any, must be made to their client applications.

APIs may contain numerous calls, in some cases tens of thousands. Any of these calls may change from an earlier version of an API to a later version. However, client applications frequently only use a subset of these calls. For example, for an API with 10,000 calls, a particular client application may use only 50 such calls. Additionally, client application developers may not upgrade the client application software every time a platform API is updated. Potential reasons for this include not having time to update the client application or wishing to avoid having to upgrade all of the client application's users to a new version of the client application. Accordingly, when a client application developer wishes to upgrade his client application to a new version of the platform API, he needs to review multiple lists of changes to calls, including many calls that the client application does not use. Further, when the same call is changed in two (or more) versions, the client application developer would need to review multiple descriptions of changes to the same call requiring him to identify all the changes that are required. This process not only takes considerable time, but introduces the possibility of errors such as missing a change to a call a client application uses and not properly understanding the full scope of changes for a call that has undergone multiple changes. Additionally, when faced with numerous changes to calls that a client application uses, the client application's developer may wish to address the calls his client application uses most frequently first.

SUMMARY

Accordingly, there is a need for a tool to provide developers with a list of changes to only those calls in a platform API which are used by a client application, and not showing changes to calls that are not used by the client platform. Further, there is a need to rank the list of changes to calls in a platform API based on the number of calls made to that call by a client application. Still further, there is a need to determine and display all changes to a call made over a series of version upgrades.

In accordance with some embodiments, a method is performed at a client device with one or more processors and memory storing instructions for execution by the one or more processors. The method includes detecting a user input specifying a first and second version of an API, where the first version predates the second version. The first and second versions of the API are then transmitted to a server system along with a request to compare the two versions of the API. In some embodiments, an application name may also be transmitted to the server. The method then includes receiving a comparison of the versions of the API that includes an indication of one or more changes to a call from the first version to the second version of the API. In some embodiments the call is one of a plurality of calls for the API and the comparison includes an indication of one or more changes to other calls of the plurality of calls. In accordance with some embodiments, the method includes displaying the comparison of the first and second versions of the API to the user. In some embodiments, there may be one or more intervening versions between the first and second versions of the API, defining a chronological sequence of versions of the API, and the client device will display an indication of one or more respective changes to the call from the earlier version of the API to the latter version of the API. In some embodiments, a graphical element having a visual characteristic that is based on a number of the one or more respective changes to the call will be displayed.

In accordance with some embodiments, a method is performed at a server system (e.g., a server hosting a comparison module) having one or more processors and memory storing instructions for execution by the one or more processors. The method includes identifying first and second versions of an API, identifying one or more calls for the API, comparing the first version of the API with the second version of the API to determine whether the one or more calls have changed from the first to the second version of the API, and providing an indication of one or more changes to the one or more calls from the first to the second version of the API. In accordance with some embodiments, an application name is received and the call is a first call of a set of calls previously made by the specified application. In some embodiments, the volume of calls made by the application to each call in the set of calls previously made by the specified application will be determined and the changed calls will be ranked according to the call volume. In accordance with some embodiments, there may be one or more intervening versions between the first and second versions of the API, defining a chronological sequence of versions of the API, and the client device will display an indication of one or more respective changes to the call from the earlier version of the API to the latter version of the API. In some embodiments, the changes to a call to a call correspond to the call existing in the first version of the API but not in the second version. In another embodiment, the changes to a call to a call correspond to the call existing in the second version but not in the first version. In yet another embodiment, the changes to a call to a call correspond to a modification of syntax for the call from the version of the API to the second version. In yet another embodiment, the changes to a call to a call correspond to a call being supported in the first version but not in the second version.

In accordance with some implementations, a server system includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the server system, cause the presentation device to perform the operations of the method described above.

Thus, client users are provided with efficient, user-friendly methods for determining what changes have been made to calls relevant to a platform's client application between two versions of an API.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

FIGS. 4A and 4B illustrate exemplary graphical user interfaces (GUIs) on a client for accepting user input and providing search results, in accordance with some embodiments.

DETAILED DESCRIPTION

Figure 1:
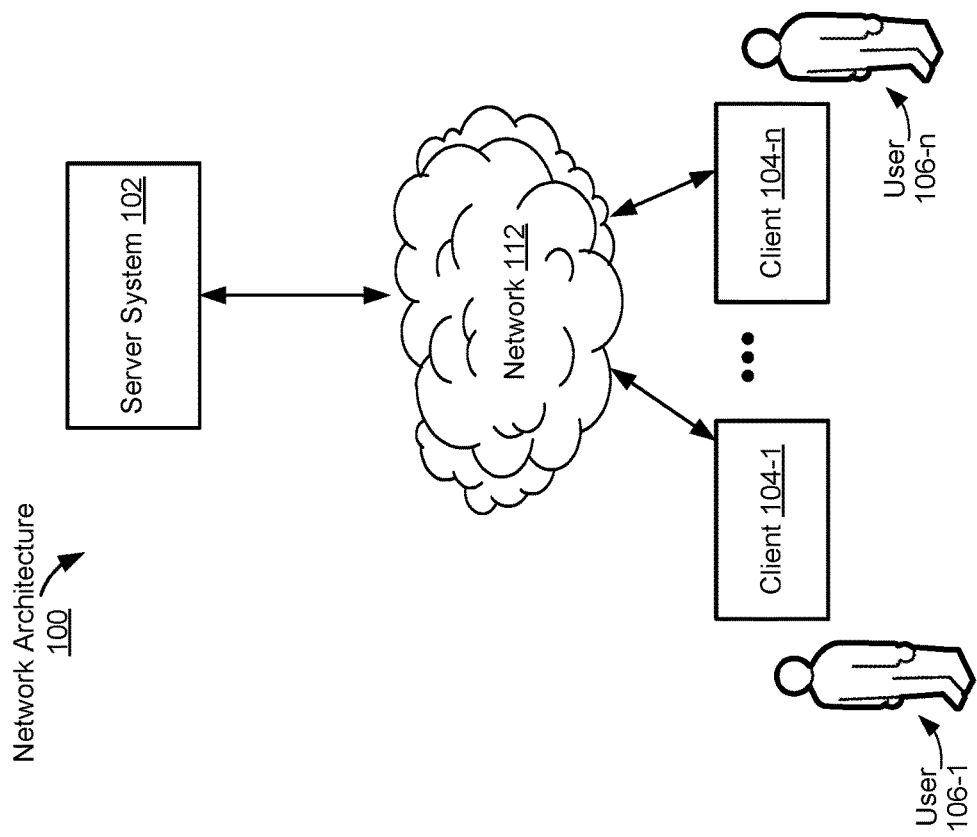
FIG. 1 is a block diagram illustrating an exemplary network architecture in accordance with some implementations.

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first call could be termed a second call, and, similarly, a second call could be termed a first call, without departing from the scope of the various described implementations. The first call and the second call are both calls, but they are not the same call. For some other elements, however, the first element must predate the second element. For example, a first version of an API (e.g., the version of an API being upgraded from) must predate the second version of an API (e.g., the version of an API being upgraded to). Both the first and second versions are versions of an API and are not the same version of the API, and the first version of the API must be earlier than the second version of the API.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture 100 in accordance with some implementations. The network architecture 100 includes one or more clients 104-1 . . . 104-n (where n is an integer greater than or equal to one) and one or more server systems 102. One or more networks 112 communicably connect each component of the network architecture 100 with other components of the network architecture 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

A client 104 (e.g. 104-1, 104-2, . . . 104-n) is associated with one or more users 106 (e.g., 106-1, 106-2, . . . 106-n). In some implementations, a client 104 is a personal computer, a mobile electronic device, a wearable computing device, a laptop, a tablet computer, a mobile phone, a feature phone, a smart phone, a digital media player, or any other device capable of capturing and/or transmitting data. In some implementations, clients 104 include input devices 208 for receiving user inputs (e.g., keyboards or mice for receiving a first version and a second version of an API and/or an application name, which the clients may store and/or transmit to other components of the network architecture 100, such as the server system 102). Clients 104 may be the same type of device (e.g., all mobile devices), or may comprise different types of devices.

Users 106 employ clients 104 to compare two versions of an API to determine calls that have changed between the two versions of the API and what changes occurred. For example, in some embodiments, a client 104 executes a web browser application that can be used to access a API version comparison service hosted by the server system 102. For another example, in some embodiments, the client 104 may execute a software application that is specific to the API comparison service (e.g., an "app" running on a smart phone or tablet).

Figure 4A:
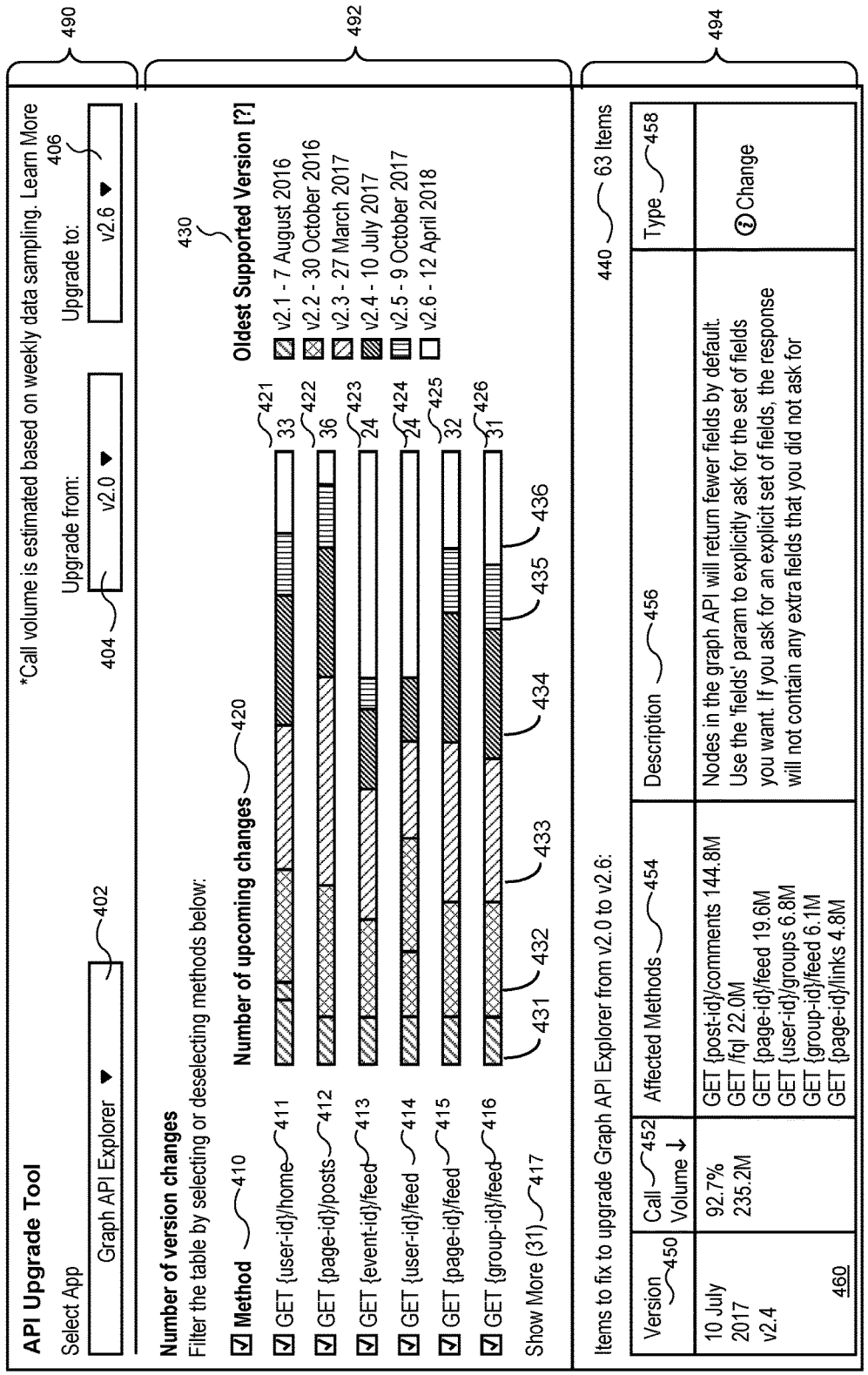
Figure 5A:
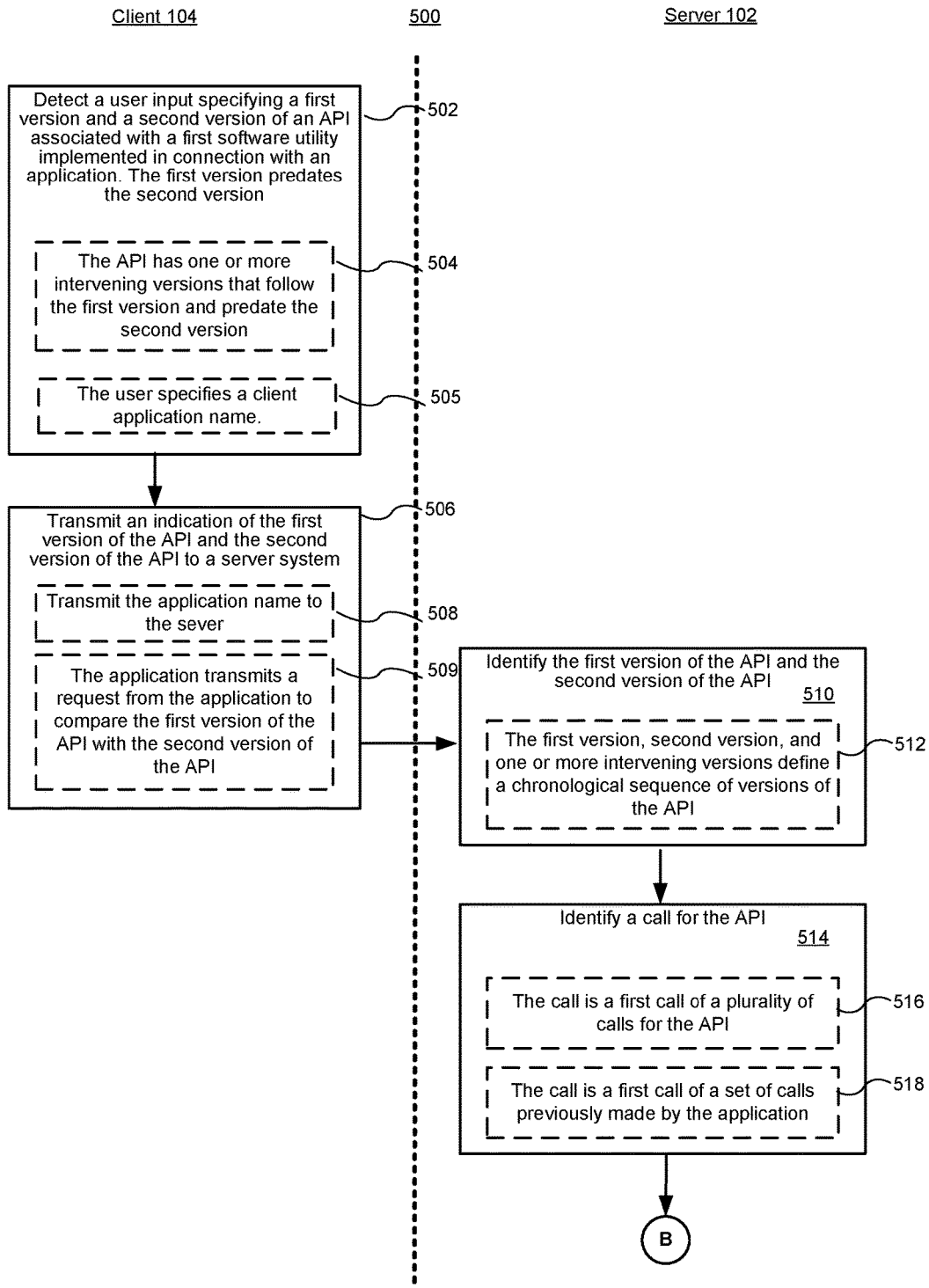
FIGS. 5A-5D are flow diagrams illustrating a method of providing the changed calls between two versions of an API, in accordance with some implementations.
Figure 5B:
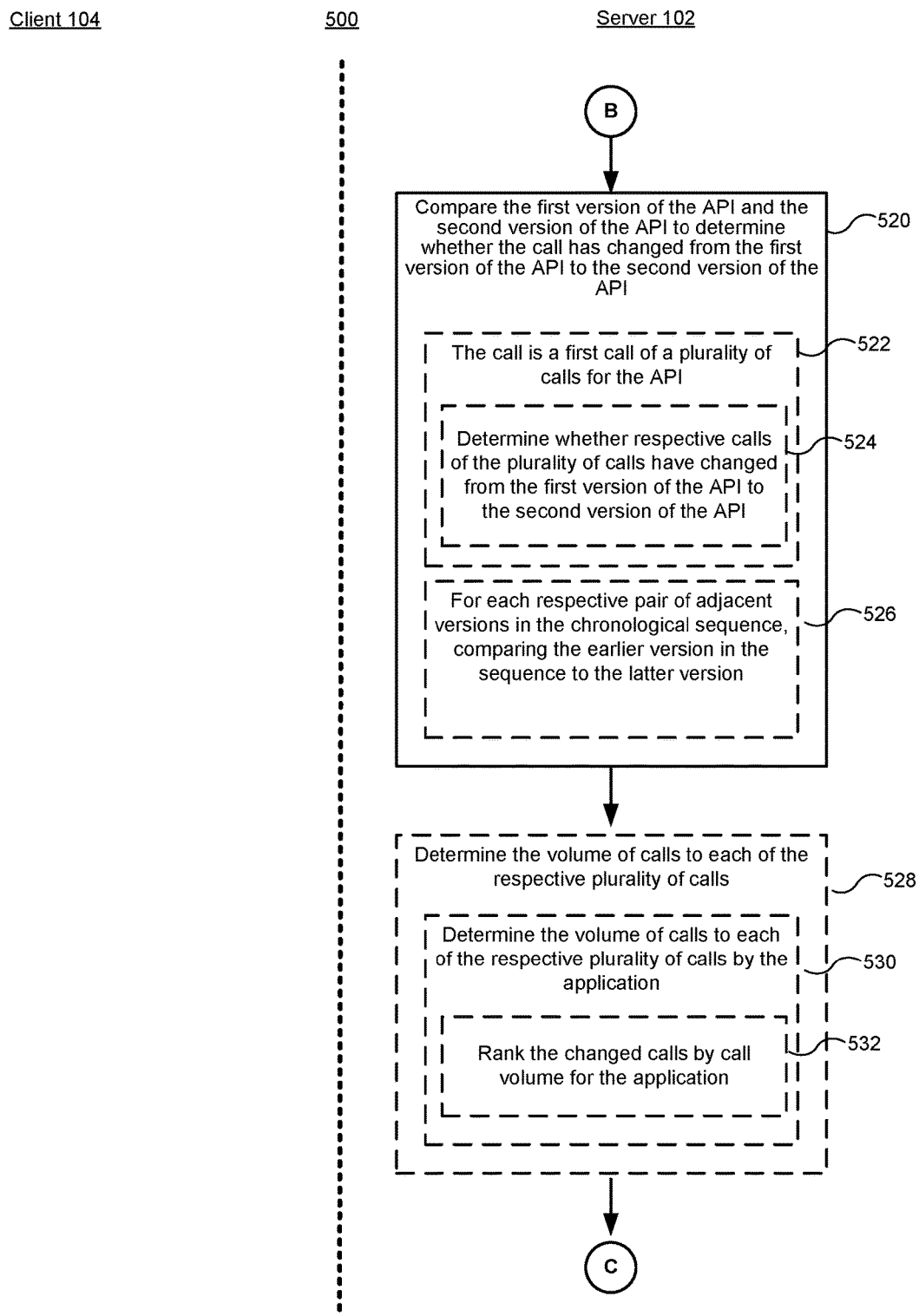
Figure 5C:
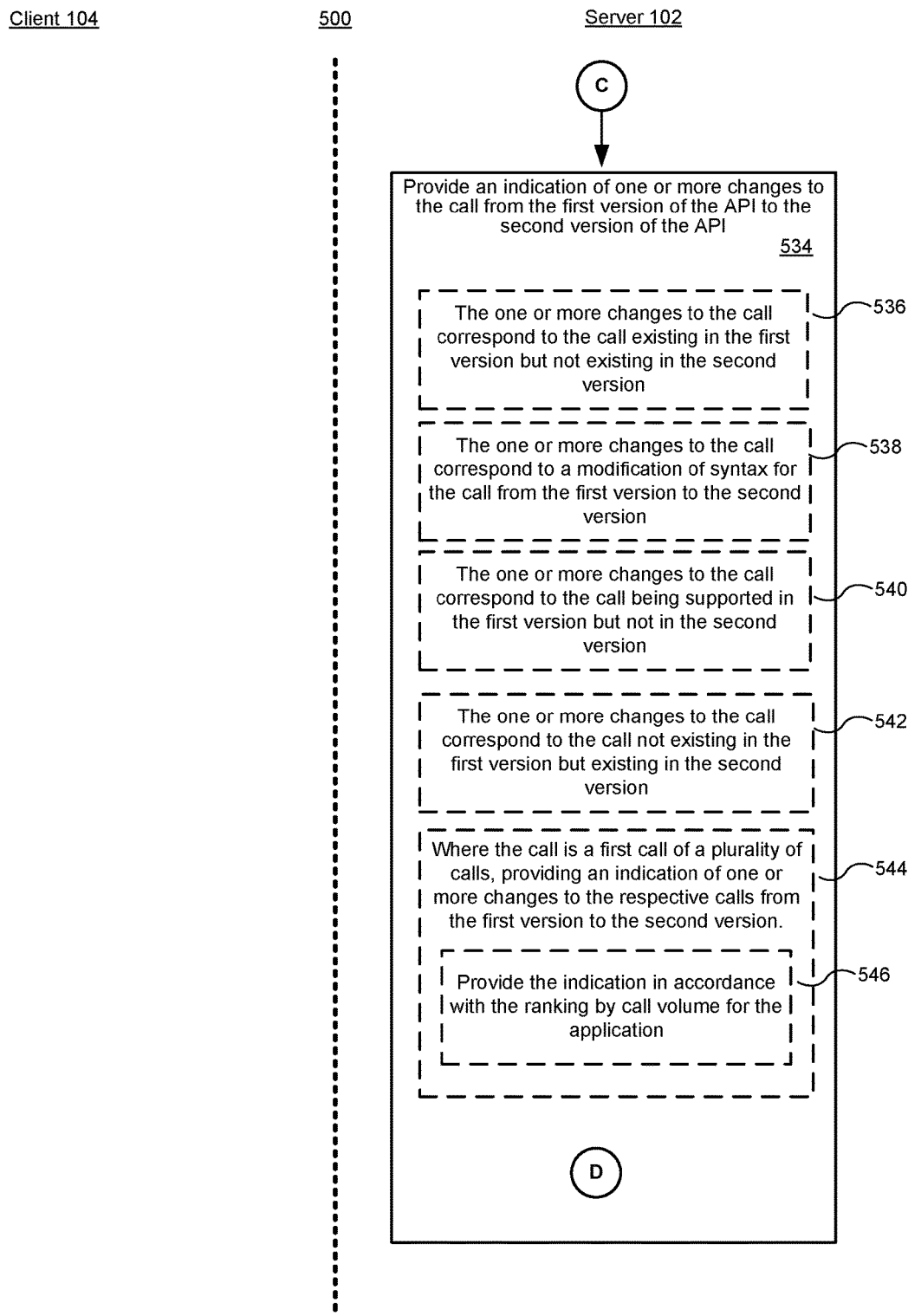
Figure 5D:
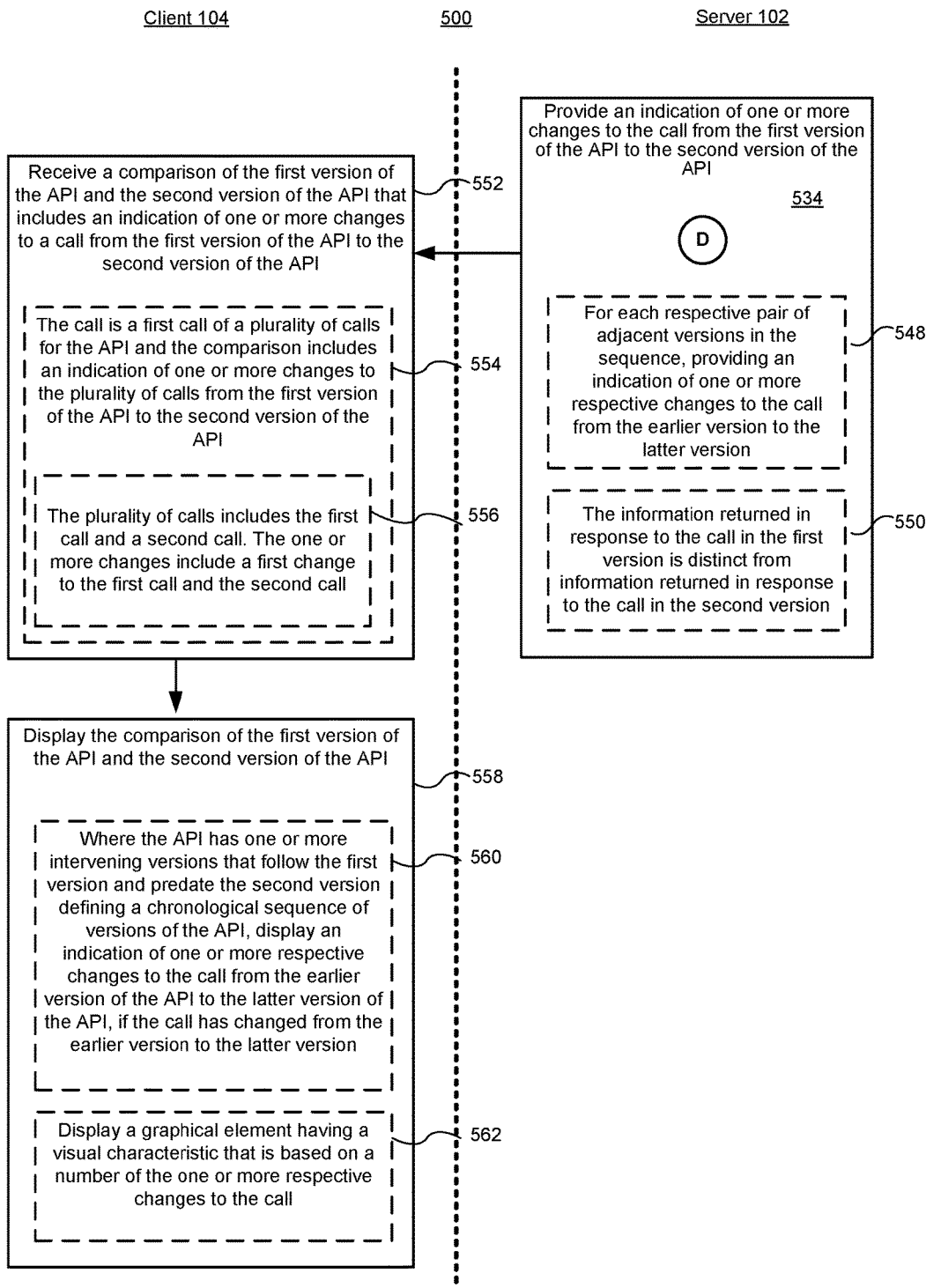

Referring to FIG. 4A, in some embodiments, users 106 interacting with the clients 104 can request comparisons of API versions by optionally specifying an API, a first version of the API 404 (i.e., the version of the API being upgraded from), and a second version of the API 406 (i.e., the version of the API being upgraded to). For example, in some embodiments, as shown in FIG. 4A, a user 106 may specify to upgrade from version 2.0 to version 2.6 of the API. Optionally, users 106 may specify a client application name 402. As explained herein, if a client application name is specified, only those changes relevant to that application will be shown. If a particular API is specified, only changes to that API will be shown.

In some embodiments, the server system 102 stores and provides content (via the network(s) 112) to the users 106 via the client 104. Content stored and served by the server system 102, in some implementations, includes lists of calls, the volume of requests made to a call, lists of changes to calls between two versions, descriptions of the changes, types of changes (e.g., new, modified, depreciated, removed), and the date and/or version in which the changes were made.

The description of the server system 102 as a "server" is intended as a functional description of the devices, systems, processor cores, and/or other components that provide the functionality attributed to the server system 102. It will be understood that the server system 102 may be a single server computer or multiple server computers. The server system 102 may be coupled to other servers and/or server systems, or other devices, such as other user devices, databases, content delivery networks (e.g., peer-to-peer networks), network caches, and the like. In some implementations, the server system 102 is implemented by multiple computing devices working together to perform the actions of a server system (e.g., cloud computing). Furthermore, any functionalities performed by the server system 102 may also be performed additionally, alternatively, and/or concurrently by the one or more clients 104.

Clients 104 and the server system 102 may be communicably coupled in a variety of ways. In some implementations, multiple clients 104 send requests to compare two versions of an API to a server system 102 via a network 112. In response to receiving the requests, the server system 102 may return the requested information to the client 104.

Figure 2:
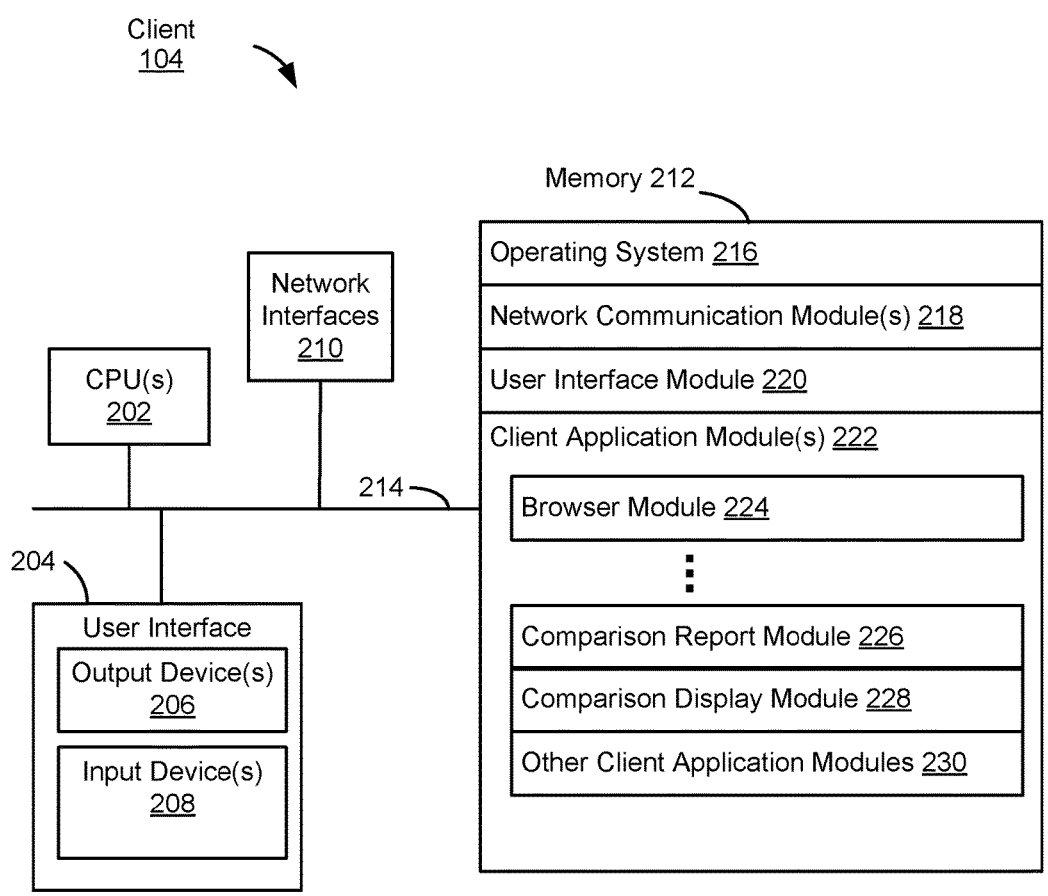
FIG. 2 is a block diagram illustrating an exemplary client in accordance with some implementations.

FIG. 2 is a block diagram illustrating an exemplary client 104 (e.g., 104-1 . . . 104-n, FIG. 1) in accordance with some implementations. The client 104 typically includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client 104 includes a user interface 204, including output device(s) 206 and input device(s) 208. In some implementations, the input devices 208 include a keyboard or mouse. Alternatively, or in addition, the user interface 204 includes a display device that may include a touch-sensitive surface, in which case the display device is a touch-sensitive display. In user devices that have a touch-sensitive display, a physical keyboard is optional (e.g., a soft keyboard may be displayed when keyboard entry is needed). Furthermore, some user devices 102 use a microphone and voice recognition device to supplement or replace the keyboard.

In some implementations, the one or more network interfaces 210 include wireless and/or wired interfaces for receiving data from and/or transmitting data to a server system 102 and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, in some implementations, the one or more network interfaces 210 includes a wireless LAN (WLAN) interface for enabling data communications with the server system 104 (via the one or more network(s) 112, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the client 104 to other computing devices (e.g., server system 102) via the one or more network interface(s) 210 (wired or wireless);
- a user interface module 220 that receives commands and/or inputs from a user 106 via the user interface 204 (e.g., from input devices 208), and provides outputs for display by the user interface 204 (e.g., the output devices 206); and
- one or more client application modules 222, including the following modules (or sets of instructions), or a subset or superset thereof:
    - a web browser module 224 (e.g., Internet Explorer by Microsoft, Firefox by Mozilla, Safari by Apple, or Chrome by Google) for accessing, viewing, and interacting with web sites (e.g., a social-networking web site provided by the server system 102),
    - a comparison report module 226 for requesting a comparison of two versions of an API (e.g., by sending requests to a server system 102);

a comparison display module 228 for providing and displaying a comparison of two versions of an API through user interface 204, and, in some embodiments, displaying a list of changed calls in an API, descriptions of each of the changes, the type of each change, the version of each change, the date of each change, and the call volume for each changed call; and/or other optional client application modules 230, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
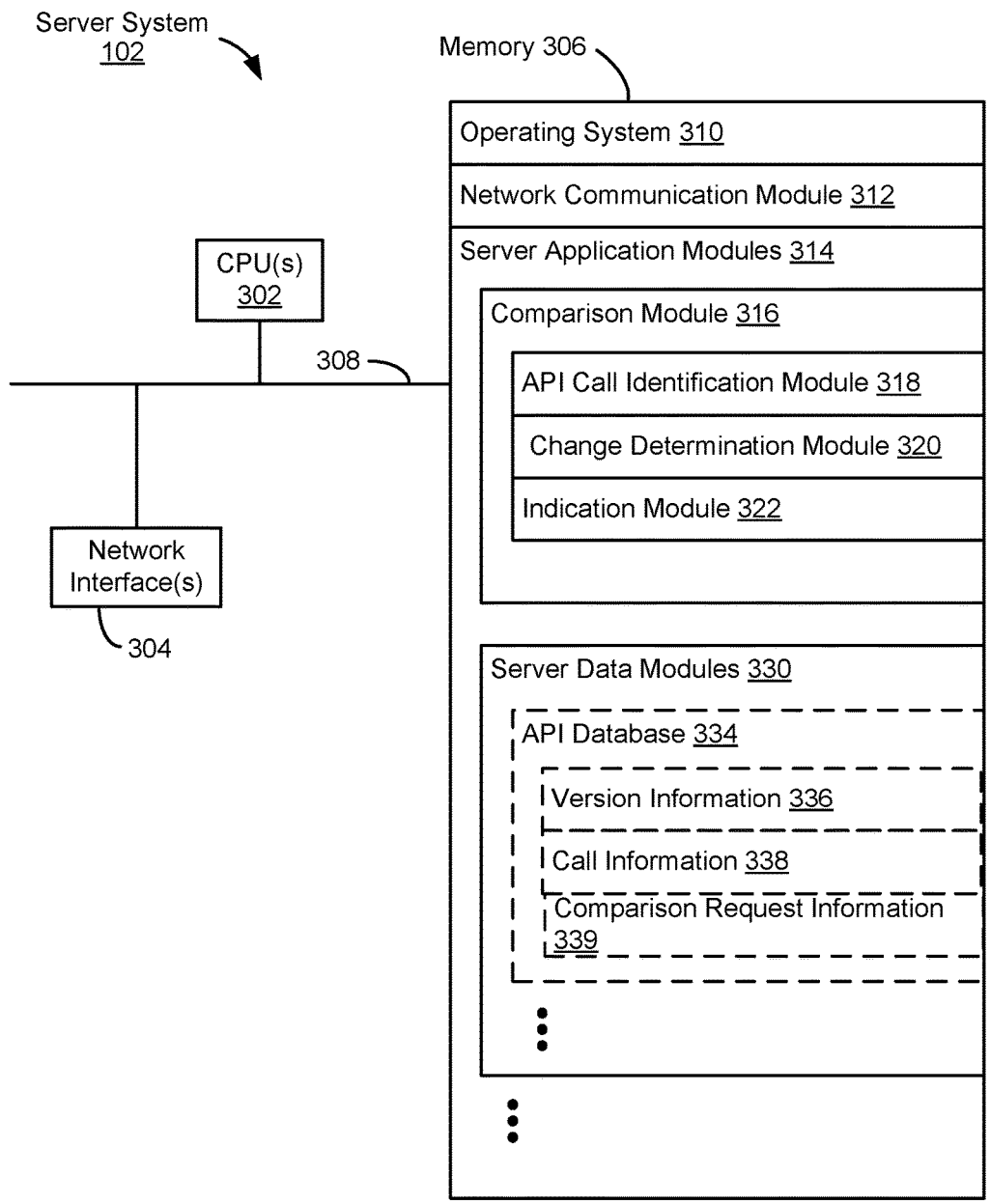
FIG. 3 is a block diagram illustrating an exemplary server system in accordance with some implementations.

FIG. 3 is a block diagram illustrating an exemplary server system 102 in accordance with some implementations. The server system 102 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

an operating system 310 that includes procedures for handling various basic system services and for performing hardware dependent tasks;

a network communication module 312 that is used for connecting the server system 104 to other computing devices (e.g., clients 102) via one or more network interfaces 304 (wired or wireless) connected to one or more networks 112 such as the Internet, other WANs, LANs, PANs, MANs, VPNs, peer-to-peer networks, content delivery networks, ad-hoc connections, and so on;

one or more server application modules 314 for enabling the server system 102 to perform various functions, the server application modules 314 including, but not limited to, one or more of:

a comparison module 316 for providing services and related features for comparing multiple versions of APIs and determining information including changed calls, the volume of calls to the changed calls, the types of changes, the dates of changes, the versions in which the changes were made, and/or descriptions of the changes (e.g., in conjunction with browser module 224 on the client 104, FIG. 2), which includes:

an API call identification module 318 for receiving comparison requests (e.g., from clients 104, FIG. 1) and determining which versions of which API to evaluate based on the requested information;

a change determination module 320 that determines which calls have changed between a first and second version of an API; and an indication module 322 for transmitting (e.g., to clients 104) data related to the comparison of APIs and one or more server data module(s) 330 for handling the storage of and access to content, including but not limited to:

an optional API database 334 storing lists of APIs, the versions of each API, and the calls associated with each version of each APIs.

The optional API database 334 stores data associated with the application programming interfaces in one or more types of databases, such as graph, dimensional, flat, hierarchical, network, object-oriented, relational, and/or XML, databases. In some embodiments, API database 334 may be accessed publically. In other embodiments, API database 334 may only be accessed by comparison module 316 and/or other server application modules 314.

In some embodiments, version information 336 includes information about the versions of the APIs stored in the API database 334. In some embodiments, this information includes which calls are supported by the respective versions of the APIs, what changes were included in the respective versions of the APIs, the categories or types of the changes made, descriptions of the changes, the dates the changes were made, and/or other information.

In some embodiments, call information 338 includes information about the calls that are supported by each of the APIs in the API database 334. In some embodiments, this information includes which calls are associated with which version(s) of an API an edge connecting a pair of nodes represents a relationship between the pair of nodes.

In some embodiments, comparison request information 339 includes information about the requests made to compare versions of APIs. In some embodiments, this information includes the client application 402, the first version 404, the second version 406, the client 102, the user 106, and/or the API(s).

In some implementations, the server system 102 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 102 in accordance with some implementations, FIG. 3 is intended more as a functional description of the various features that may be present in one or more server systems than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement the server system 102, and how features are allocated among them, will vary from one implementation to another and, optionally, depends in part on the amount of data traffic that the server system handles during peak usage periods as well as during average usage periods.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

FIGS. 4A-4B illustrate exemplary GUIs on a client 104 for accepting user input and providing search results, in accordance with some embodiments. The GUIs in these figures are used to illustrate the processes described below, including the method 500 (FIGS. 5A-5D). While FIGS. 4A-4B illustrate examples of GUIs, in other embodiments, one or more GUIs display user-interface elements in arrangements distinct from the embodiments of FIGS. 4A-4B.

The exemplary GUIs in FIGS. 4A and 4B are presented on the client 104 to the users 106 of the API comparison tool. The GUIs shown in FIGS. 4A-4B may be provided by a web browser (e.g., browser module 224, FIG. 2), comparison report module 226, comparison display module 228, and/or another application (e.g., other client application module 230) that may be provided by a third-party.

For illustrative purposes and to help in describing the features shown in the figures, FIGS. 4A and 4B have been divided into sections 490, 492, and 494. These sections are merely exemplary and sections could be combined, further divided, or placed on different windows or screens depending on the configuration of client 104. Indeed, some embodiments may not have all of these sections. For example, if client 104 were a mobile device, such as a smartphone, client 104 may deploy each section on a separate screen. For another example, if client 104 were a desktop computer with a large display screen, the sections could be combined, permitting user 106 to see all of the sections in one location.

FIG. 4A shows an exemplary request and results GUI. Some fields shown are optional and some other fields are not shown for simplicity purposes. Referring to the top section of FIG. 4A, labeled for illustrative purposes as 490, certain options are presented to the user 106. In some embodiments, the user 106 will first specify a platform API to be upgraded (not shown) and the results will be limited to just the specified API. In some embodiments, the user 106 may specify the name of his client application(s) 402. In these embodiments, the results will be limited to the API(s) used by the client application(s) 402. In some embodiments, the client 104 will display a list of client application(s) 402 for the user 106 to select from. The user 106 can specify the API version to be upgraded from 404 and the version to be upgraded to 406. In some embodiments, client 104 may display default selections of the API version to be upgraded from 404 and the API version to be upgraded to 406. In some embodiments, the default version to be upgraded from 404 may be version of the API that the application is currently using. In some embodiments, the default version to be upgraded to 406 may be the latest public version of the API. In some embodiments, the default version to be upgraded to 406 may be a non-public (e.g., alpha or beta) version. As discussed with respect to FIG. 5, this information is transmitted by client 104 to server system 102 and is used by server system 102 to determine what information to send back to the user 106 via client 104.

The remaining sections of FIG. 4A and FIG. 4B show exemplary API comparison results. The middle section of FIG. 4A, labeled as 492, provides a summary of the changed calls. In some embodiments, this summary includes the changed method signatures 410. (For clarity, the terms "method signatures" and "methods" used in this instance are separate terms from the terms "method" or "methods" used to describe a process or flowchart elsewhere in this specification.) In some embodiments, the client 104 will provide a means for user 106 to specify which calls he or she wishes to see. Where the number of changed method signatures is greater than the number that client 104 can legibly display on the screen, in some embodiments, client 106 will limit the number of calls (or method signatures) displayed and will provide user 106 with a prompt 417 or other affordance to view the remaining items. For example, in some embodiments, client 104 will permit user 106 to scroll to display the remaining items. In some embodiments, this list of calls will be ordered, such as by call volume. In some embodiments the number of upcoming changes 420 is displayed. In some embodiments, the changes are broken down and displayed separately for each call. For example, as shown in FIG. 4A, changes 421, 422, 423, 424, 425, and 426 map respectively to calls 411, 412, 413, 414, 415, and 416. Client 104 will display each version from the version following the version to be upgraded from 404 to the version to be upgraded to 406. In some embodiments, the number of upcoming changes 420 is broken down by the oldest supported version 430. Using exemplary call 416, upcoming changes 420 is broken down into versions v2.1, v2.2, v2.3, v2.4, v2.5, and v.2.6, which map respectively to 431, 432, 433, 434, 435, and 436. This division permits user 106 to determine the relative amount of changes (and thus upgrade development work on the client application) for each new version. In some embodiments, estimated dates for when support for each version will be ended are provided. In some embodiments, users 106 may obtain additional information through an option displayed on client 104 or other affordance (e.g., a mouse hover).

In some embodiments, section 494 displays additional information to user 106 regarding the changes to the API. In some embodiments, this information will include the version in which the changes were made 450, the call volume 452, a list of the affected method signatures 454, a description of the changes 456, and/or the type of change 458. In some embodiments, as shown in FIGS. 4A and 4B, this information will be displayed in table form with the types of information as the columns and the respective changes as the rows (e.g., 460 on FIG. 4A and 462, 464, 466, and 468 on FIG. 4B). In some embodiments, the rows will be ordered by one or more of the columns. For example, as shown in FIG. 4B, rows are ordered by descending call volume. In some embodiments, a summary of the information being presented and/or a count of the items 440 will be displayed.

In some embodiments, version 450 is the version in which the change was first implemented. In other words, version 450 is the first version of the API in which the change appears. Version 450 will always be greater than the version to be upgraded from 404 and will never be higher than the version to be upgraded to 406. In some embodiments, the version 450 will also include the date the change was implemented. Depending on the changes to the API, there may be more than one change listed for an API version. For example, as shown in FIG. 4B, both changes 466 and 468 occurred in v2.5 of the API.

In some embodiments, call volume 452 is the volume of calls made to the listed API version. In some embodiments, the call volume may be displayed in numbers of calls and/or percentage of calls. In some embodiments, where a client application 402 is specified, the call volume for just the specified client application 402 may be displayed, either alone or alongside the total call volume. The affected methods 454 include the one or more method signatures that are impacted by the API change. In some embodiments, the call volume 452 to each method signature may also be displayed. In some embodiments, the methods 454 may be ordered, such as by call volume 452.

In some embodiments, description 456 and type 458 provide user 106 with information regarding the nature of the change and why it was made. The type 106 specifies what type or kind of change was made to the API. In some embodiments, these types include: new (e.g., one or more method signatures were added that did not exist in the prior version), change (e.g., one or more existing method signatures were modified), or deprecation (e.g., one or more existing method signatures are no longer in the new version supported or removed in the new version). The type may be displayed textually, with a symbol indicating the type, or, as shown in FIGS. 4A and 4B, with both text and a symbol. Those of skill will recognize that other types 458 exist and would be within the scope of the claimed invention. Description 456 provides a description of the change. In some embodiments, this description will be textual. In some embodiments, description 456 may include the one or more reasons why the change was implemented, instructions and/or best practices for using the API change, and/or one or more benefits the change provides to client applications 402.

The examples shown in FIGS. 4A-4B illustrate one way in which user 106 input can be received and the results displayed on client 104. In other embodiments, user input and search results may be displayed in a means distinct from the examples of FIGS. 4A-4B and may include additional and/or alternative options. Implementations of the method for producing the data shown on exemplary GUIs FIGS. 4A and 4B are described in greater detail with respect to the method 500 (FIG. 5).

FIG. 5 is a flow diagram illustrating a method 500 of requesting and receiving comparison information with respect to two or more versions of an API.

The steps of the method 500 may be performed by any combination of one or more clients 104 (FIGS. 1 and 2) and/or server systems 102 (FIGS. 1 and 3). FIG. 5 corresponds to instructions stored in computer memory (e.g., memory 212 of the client 104, FIG. 2; memory 306 of the server system 102, FIG. 3; or other computer-readable storage medium.

In some embodiments, in performing the method 500, in step 502, one or more clients 104 detect an input from user 106 specifying a first version 404 and a second version 406 of an API. The first version 404 will predate the second version 406. In some embodiments, the API may have one or more intervening versions that follow first version 404 and predate second version 406 (504). In some embodiments, user 106 may specify a client application name 402 (505).

In some embodiments, the client 104 transmits (506) an indication of the first version 404 and the second version 406 of the API to a server 102. In some embodiments, the application transmits (509) a request from the client application 402 to compare the first version 404 of the API with the second version 406 of the API. Where the client application name 402 was specified, the client 104 may transmit (508) the client application name 402 to the server 102.

In some embodiments, the server 102 may receive the information transmitted from client 104 and will identify (510) the first version 404 and second version 406 of the API. In some embodiments, the first version 404, second version 406, and one or more intervening versions define (512) a chronological sequence of versions of the API. In some embodiments, where there are one or more intervening versions of the API, for each respective pair of intervening versions, server 102 may perform a comparison one the pair. For example, in the example shown in FIG. 4A, first version 404 is v2.0, second version 406 is v2.6, and there are 5 intervening versions (i.e., v2.1, v2.2, v2.3, v2.4, and v2.5). In this example, server 102 may identify first version 404 (i.e., v2.0), second version 406 (i.e., v2.6), and each intervening version (i.e., v2.1, v2.1 and v2.2, v2.2 and v2.3, v2.3 and v2.4, v2.4 and v2.5, and v2.5). This ensures that all changes made in any version in the specified range can be determined and eventually displayed to user 106.

In some embodiments, the server system 102 stores (not shown) the requests, such as in a server data module 330, FIG. 3. This will permit future analysis of the usage of the comparison tool by the various users 106. In some embodiments, this information may be stored in API database 334.

In some embodiments, the server system 102 may identify (514) a call for the API from the request. In some embodiments, the call will be a first call of a plurality of calls for the API. Where a client application name 402 was transmitted (508) by client 104, the call may be a first call of a set of calls previously made by the client application. In some embodiments, the identification is done in API call identification module 318.

In some embodiments, change determination module 320 of server 102 compares (520) the first version 404 of the API against the second version of the API to determine whether the call has changed from the first version 404 to the second version 406. In some embodiments, the call is a first call of a plurality of calls for the API (522). In some such embodiments, server 102 may determine (524) whether respective calls of the plurality of calls have changed from the first version 404 of the API to the second version 406. In some embodiments, for each respective pair of adjacent versions in a chronological sequence of versions, server 102 may compare (526) the earlier version in each pair to the latter version in the pair. For example, in the example shown in FIG. 4A, there are five intervening versions (i.e., v2.1, v2.2, v2.3, v2.4, and v2.5) between first version 404 (i.e., v2.0) and second version 406 (i.e., v2.6). In this example, server 102 may perform a comparison between first version v2.0 and intervening version v2.1, v2.1 and v2.2, v2.2 and v2.3, v2.3 and v2.4, v2.4 and v2.5, and v2.5 and second version v2.6. This ensures that all changes made in either the second version 406 or in any intervening version are determined and eventually may be displayed to user 106.

In some embodiments, server 102 may determine (528) the volume of calls made to each of the respective plurality of calls. Where a client application name 402 was transmitted (508) by client 104, the server 102 may determine (530) the volume of calls to each of the respective plurality of calls made by the specified application. In some embodiments, this determination will be made by the API call identification module 318. Server system 102 and/or client 104 may use the call volume information in determining which calls to display and/or the order to display them. With respect to the display order of the calls, in some embodiments, server 102 may rank (532) the calls by call volume for the application. In some embodiments, server 102 may rank the calls by total call volume. The call volume information may further be displayed to user 106. This may be sortable based on the preference of user 106.

In some embodiments, indication module 322 of server 102 may provide (534) an indication of one or more changes to the call from the first version 404 to the second version 406 of the API. In some embodiments, the one or more changes may correspond to the call existing in first version 404 but not existing in second version 406. This is known as a "new" type of change. New changes provide additional method signatures that a client application 402 may call, but do not necessarily impact existing calls. Accordingly, a user 106 may determine that it is not necessary to make updates to his client application to accommodate this change in order to upgrade to using the second version 406 of the API. In some embodiments, the one or more changes may correspond to a modification of the syntax for the call from first version 404 to second version 406. This is known as a "change" type of change. Because syntax modifications result in the call being different in the latter version of the API, changes to client applications 402 may need to be made in order for the client application 402 to use the latter version of the API. In some embodiments, the one or more changes to the call may correspond to the call being supported in first version 404 of the API but not in second version 406. Similarly, in some embodiments, the one or more changes to the call may correspond to the call existing in first version 404 of the API but not in second version 406. These last two changes are known as "depreciation" types of changes. Where a call is no longer supported or has been removed in a latter version of the API, client applications may need to be updated to no longer use that call in order to use the newer version of the API.

Where the call is a first call of a plurality of calls, server 102 provides (544) an indication of one or more changes to the respective calls from the first version 404 to the second version 406 of the API. In some embodiments, this indication is provided (546) in accordance with the ranking by call volume for client application 402. In some embodiments, the indication is provided in accordance with the ranking by total call volume. In some embodiments, the ranking may be done by client 104. Providing the indication by ranking permits, for example, client 102 to display only the top few calls as shown in section 492 of FIG. 4A or, for another example, as shown in section 494 of FIG. 4B, displaying the rows of changes (e.g., 462, 464, 466, 468, and 469 and other rows not shown) ordered by those with the most calls by the application.

In some embodiments, where there is one or more intervening versions of the API between first version 404 and second version 406, thus forming a chronological sequence of versions, for each respective pair of adjacent versions in the sequence, providing (548) an indication of one or more respective changes to the call from each earlier version in the pair to the latter version in the pair. In some embodiments, where a latter change negates an earlier change, server 102 may not provide an indication of the earlier change. For example, where a user 106 requested information from first version 404 of v2.0 to second version 406 of v2.5, a "change" change from v2.0 to v2.1 which modifies the syntax of a method signature, may not be indicated where a "depreciation" change from v2.1 to v2.2 removes the method from the API. Instead, server 102 may only indicate the latter (i.e., the depreciation) change.

As shown in 550, in some embodiments, the information returned in response to the call in the first version may be distinct from information returned in response to the call in the second version.

Server 102 transmits the indication to client 104. Thus, client 104 receives (552) the comparison of the first version 404 and second version 406 of the API including an indication of one or more changes to a call from the first version 404 of the API to the second version 406 of the API. Because first version 404 must predate second version 406, there should always be at least one change in the API. However, where client application 402 was specified, it is possible that there are no changes between first version 404 and second version 406 which have been called by client application 402. In such situations, in some embodiments, a message may be displayed informing user 106 that there are no relevant changes from first version 404 to second version 406 of the API. In some embodiments, the call may be a first call of a plurality of calls for the API and the comparison thus includes (554) an indication of one or more changes to the plurality of calls from the first version 404 to the second version 406. In some such embodiments, the plurality of calls includes the first call and a second call. Accordingly, the one or more changes include (556) a first change to the first call and the second call.

Comparison display module 228 of client 104 displays (558) the comparison of the first version 404 of the API against the second version 406 of the API. Nonlimiting examples of this display are shown in FIGS. 4A and 4B. In some embodiments, where the API has one or more intervening versions that follow the first version and predate the second version defining a chronological sequence of versions of the API, for each respective pair of adjacent versions, client 104 may display (560) an indication of one or more respective changes to the call from the earlier version of the API to the latter version of the API, if the call has changed from the earlier version to the latter version. In some embodiments, where a latter change negates an earlier change, client 104 may not provide an indication of the earlier change. For example, where a user 106 requested information from first version 404 of v2.0 to second version 406 of v2.5, a "change" from v2.0 to v2.1 that modifies the syntax of a method signature may not be displayed where a "depreciation" change from v2.1 to v2.2 removes the method from the API. Instead, client 104 may display only the latter change (i.e., the depreciation change).

In some embodiments, comparison display module 228 of client 104 may display (562) a graphical element having a visual characteristic that is based on a number of the one or more respective changes to the call. This visual characteristic may take many forms, including color, size, style, texture, sharpness, brightness, etc., and may vary based on the type of client 104 and the output device(s) 208 available on the client 104. An example of this visual characteristic is shown in 420, FIG. 4. In this example, a bar graph is shown with sections showing the relative amounts of changes in second version 406 and in each of five intervening versions. Looking specifically at exemplary bar 426, the respective sizes of bar sections 431, 432, 433, 434, 435, and 436 show the relative amounts of changes to the corresponding method 410 (i.e., 416) in each of the six versions. In some embodiments, client 102 may also provide an option to deselect (and/or reselect) methods 410 to display. In such embodiments, when a user 106 deselects a method, the method may be removed from rows in section 494, and, if there are no remaining affected methods 454 in a row, the entire row may be removed. For example, if method 415 (i.e., "GET {page-id}/feed") were deselected, such as by unchecking the box corresponding to the method, the corresponding method may be removed from row 460.

Figure 6:
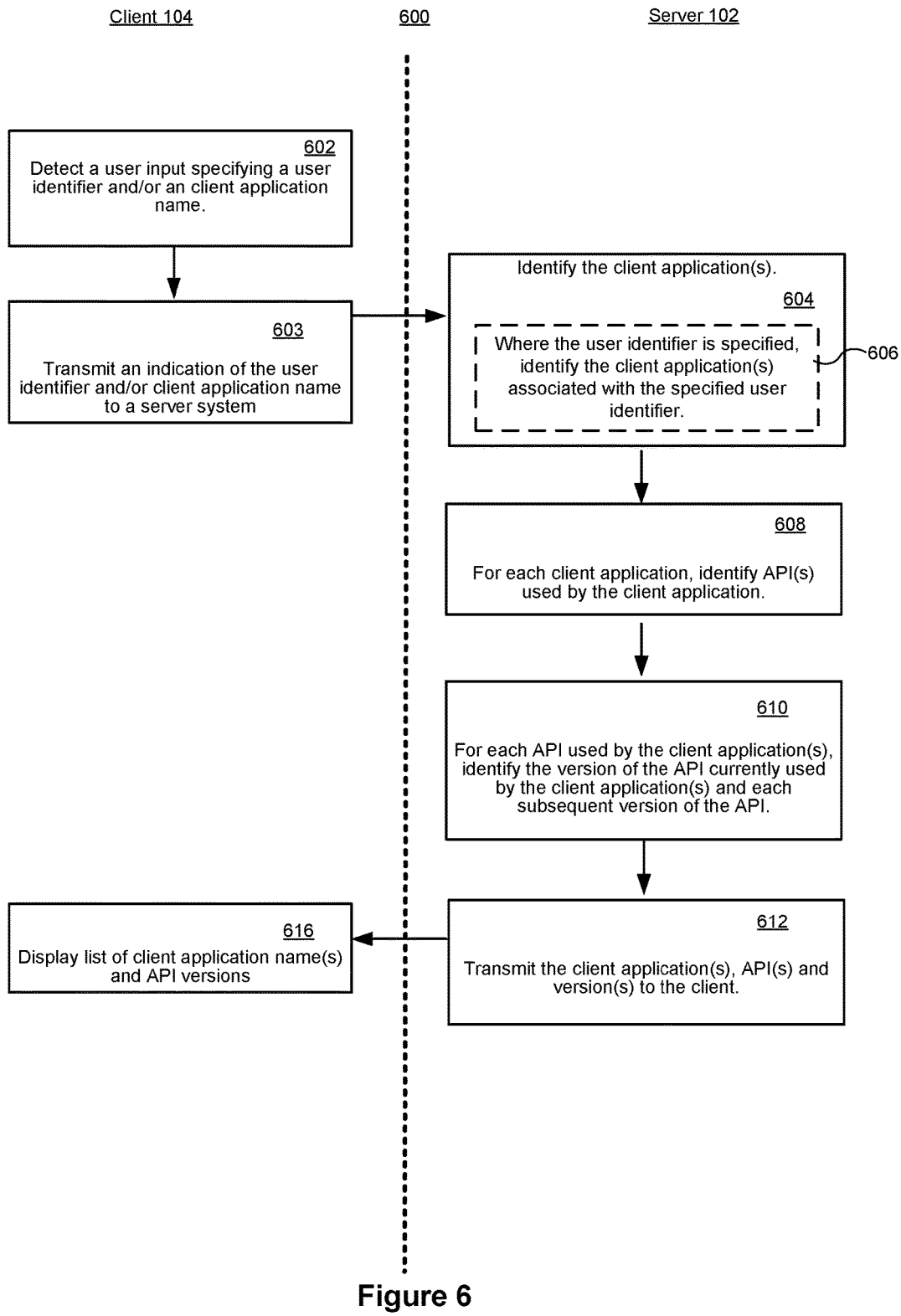
FIG. 6 is a flow diagram illustrating a method of providing default client applications and/or API versions, in accordance with some implementations.

FIG. 6 is a flow diagram illustrating a method 600 of requesting and determining versions of APIs associated with a client application in accordance with some implementations.

The steps of the method 600 may be performed by any combination of a client 104 (FIGS. 1 and 2) and/or a server system 102 (FIGS. 1 and 3). FIG. 6 corresponds to instructions stored in computer memory (e.g., memory 212 of the client 104, FIG. 2; memory 306 of the server system 102, FIG. 3; or other computer-readable storage medium).

In some embodiments, in performing the method 600 the client 104 detects (602) an input from user 106 specifying a user identifier. In some embodiments, the user identifier may be an email address. In some embodiments the user identifier may be an account name. In some embodiments, the user 106 may specify a client application name 402.

In some embodiments, the client 104 transmits (603) an indication of the user identifier and/or client application name 402 to the server system 102.

In some embodiments, the server 102 receives the information transmitted from client 104 and identifies (604) the client application(s) 402. Where a user identifier was received, the server 102 may identify the client applications based on data stored on the server, such as in server data modules 330, FIG. 3.

In some embodiments, the server 102 may identify (608) one or more APIs used by each client application. In some embodiments, the server 102 may identify the API(s) based on data stored on the server, such as in server data modules 330, FIG. 3.

In some embodiments, the server 102 determines (610) the version of the API(s) currently used by the client application(s) and/or the latest version of the API(s). The latest version may be a public (e.g., released) version of the API or it may be a non-released (e.g., alpha or beta) version of the API.

In some embodiments, the server 102 transmits (612) the client application(s), API(s), and API version(s) to the client 104.

In some embodiments, client 104 displays (616) information received from server 102 including one or more of the client application(s), API(s), and API version(s) to the user 106. In some implementations, the information may be used to populate fields on input screens, such as the one shown in section 490 of FIG. 4A. For example, in some embodiments, client 104 may display a list of client applications 402. For another example client 104 may display a list of versions to be upgraded from 404 and versions to be upgraded to 406. In some embodiments, client 104 will select a default version to be upgraded from 404 and/or version to be upgraded to 106 for display to user 106. The default version to be upgraded from 404 may be based on the API version the selected client application 402 is currently using. In some embodiments, the default version to be upgraded to 406 may be based the latest version of the API. In some embodiments, the default version to be upgraded to 406 may be the latest public version of the API.

In some embodiments, the method 600 is performed in conjunction with method 500. For example, the list of versions may be used to provide default values for the API version to be upgraded from 404 and the version to be upgraded to 406.

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
at an electronic system having one or more processors and memory storing instructions for execution by the one or more processors:
receiving, from an application on a client device, a call to a first method in an application programming interface (API);
receiving, from a first software utility implemented in connection with the application, a request to compare a first version of the API with a second version of the API;
identifying the first version of the API and the second version of the API, wherein the first version predates the second version;
identifying the call to the API as a first call of a plurality of calls previously made to the API by the application;
comparing the first version of the API to the second version of the API to determine whether any method signature for the first method has changed from the first version of the API to the second version of the API; and
in accordance with determining that a first method signature for the first method has changed, providing, to the client device, an indication of one or more changes to the first method signature from the first version of the API to the second version of the API, wherein the indication specifies:
call volume to the first method according to the plurality of calls previously made to the API by the application;
a description of the first method; and
a list of method signatures for the first method that changed between the first version of the API and the second version of the API.

2. The method of claim 1, wherein the one or more changes to the first method signature correspond to a modification of syntax for the first method signature from the first version of the API to the second version of the API.

3. The method of claim 1, wherein the one or more changes to first method signature identify differences between data returned in response to a call to the first method in the first version and data returned in response to a call to the first method in the second version.

4. The method of claim 1, wherein the one or more changes to the first method signature identify the first method signature as existing in the first version of the API but not existing in the second version of the API.

5. The method of claim 1, wherein the one or more changes to the first method signature identify the first method signature as supported in the first version of the API but deprecated in the second version of the API.

6. The method of claim 1, further comprising ranking the method signatures in the list according to call volume from the application;
wherein the indication lists the method signatures in accordance with the ranking.

7. The method of claim 1, wherein the API has one or more intervening versions that follow the first version and predate the second version.

8. The method of claim 7, wherein:
the first version, the second version, and the one or more intervening versions of the API define a chronological sequence of versions of the API;
the comparing comprises, for each pair of adjacent versions in the sequence, wherein each pair includes a respective earlier version and a respective latter version:
comparing the earlier version of the API and the latter version of the API to determine whether any method signature for the first method has changed from the earlier version to the latter version; and
the providing comprises, for each pair of adjacent versions in the sequence for which one or more method signatures for the first method has changed between the earlier version and the latter version:
providing a respective indication of one or more respective changes to one or more method signatures for the first method from the earlier version to the latter version.

9. A method, comprising:
at a client device having one or more processors and memory storing instructions for execution by the one or more processors:
calling, from an application on the client device, a first method in an application programming interface (API), wherein the API is associated with a first software utility implemented in connection with the application, and wherein the call is one of a plurality of calls by the application to the first method in the API;
detecting a user input specifying a first version and a second version of the API, wherein the first version predates the second version;
transmitting identifiers of the first version of the API and the second version of the API to a server system;
in response to transmitting the identifiers, receiving from the server system a comparison of method signatures for the first method between the first version of the API and the second version of the API, wherein the comparison includes an indication of one or more changes to a first method signature of the first method between the first version of the API to the second version of the API, and the indication specifies:
call volume to the first method according to the plurality of calls by the application to the first method in the API;
a description of the first method; and
a list of method signatures for the first method that changed between the first version of the API and the second version of the API; and
displaying the indication in a graphical user interface on the client device, including displaying the call volume, the description of the first method, and the list of method signatures.

10. The method of claim 9, wherein:
the API has one or more intervening versions that follow the first version and predate the second version, wherein the first version, the second version, and the one or more intervening versions define a chronological sequence of versions of the API; and
displaying the indication includes, for each pair of adjacent versions in the sequence, wherein each pair includes a respective earlier version and a respective latter version:
displaying a respective indication of one or more respective changes to one or more method signatures for the first method from the earlier version of the API to the latter version of the API.

11. A non-transitory computer-readable storage medium storing one or more programs for execution by one or more processors, the one or more programs including instructions for:
calling, from an application on the client device, a first method in an application programming interface (API), wherein the API is associated with a first software utility implemented in connection with the application, and wherein the call is one of a plurality of calls by the application to the first method in the API;
detecting a user input specifying a first version and a second version of the API, wherein the first version predates the second version;
transmitting identifiers of the first version of the API and the second version of the API to a server system;
in response to transmitting the identifiers, receiving from the server system a comparison of method signatures for the first method between the first version of the API and the second version of the API, wherein the comparison includes an indication of one or more changes to a first method signature of the first method between the first version of the API to the second version of the API, and the indication specifies:
call volume to the first method according to the plurality of calls by the application to the first method in the API;
a description of the first method; and
a list of method signatures for the first method that changed between the first version of the API and the second version of the API; and
displaying the indication in a graphical user interface on the client device, including displaying the call volume, the description of the first method, and the list of method signatures.

* * * * *